United States Patent
Truong et al.

(10) Patent No.: US 7,181,236 B1
(45) Date of Patent: Feb. 20, 2007

(54) SYSTEMS AND METHODS FOR USING A WIRELESS MODEM CARD

(75) Inventors: Thomas Truong, San Diego, OH (US); Kwun Ho, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 800 days.

(21) Appl. No.: 09/877,886

(22) Filed: Jun. 8, 2001

(51) Int. Cl.
*H04M 1/00* (2006.01)
(52) U.S. Cl. .................. 455/550.1; 455/557; 455/558; 375/222; 379/120
(58) Field of Classification Search ................ 375/222; 455/550.1, 557, 558; 379/120
See application file for complete search history.

(56) References Cited

U.S. PATENT DOCUMENTS

| | | | | |
|---|---|---|---|---|
| 4,996,706 A | * | 2/1991 | Cho | 379/102.04 |
| 5,353,334 A | * | 10/1994 | O'Sullivan | 455/557 |
| 5,392,023 A | * | 2/1995 | D'Avello et al. | 358/400 |
| 5,748,443 A | * | 5/1998 | Flint et al. | 361/686 |
| 5,889,816 A | * | 3/1999 | Agrawal et al. | 375/220 |
| 6,003,135 A | * | 12/1999 | Bialick et al. | 726/29 |
| 6,088,802 A | * | 7/2000 | Bialick et al. | 726/3 |
| 6,751,474 B1 | * | 6/2004 | Lin et al. | 455/557 |
| 6,785,556 B2 | * | 8/2004 | Souissi | 455/557 |
| 6,804,541 B1 | * | 10/2004 | Muramatsu et al. | 455/573 |

* cited by examiner

*Primary Examiner*—Quynh H. Nguyen
(74) *Attorney, Agent, or Firm*—Foley & Lardner LLP

(57) ABSTRACT

A wireless modem card comprises a host interface configured to interface the wireless modem card with a host device of a first type. The wireless modem card can be configured to detect whether a modem interface device configured to interface the wireless modem card with a host device of a second type is communicatively coupled with the host interface. The wireless modem card is also configured to reconfigure the host interface in response to the presence of the modem interface device to enable the wireless modem card to interface with the host device of the second type through the modem interface device.

32 Claims, 3 Drawing Sheets

SYSTEMS AND METHODS FOR USING A WIRELESS MODEM CARD

BACKGROUND OF THE INVENTION

1. Field of the Invention

The invention relates generally to wireless communication and more particularly to systems and methods for using a wireless modem card.

2. Background

Portable devices of all shapes and sizes are being designed with wireless capability. In the case of laptop computers, for example, a common method of providing wireless capability is via a wireless modem card that can be inserted into one of the laptop's expansion slots, such as a PCMCIA expansion slot.

PCMCIA is an organization that has developed a standard for credit card-sized "PC cards" that can be used to increase the functionality and features of portable computers. Originally, such cards were designed to add memory, but other uses now include adding portable disk drives, dial-up modems, and fax modems. Additionally, several vendors make PCMCIA wireless modem cards.

The PCMCIA standard defines three card types, Types I, II, and III, that have varying thickness. The PCMCIA standard also defines a particular interface between the card and the laptop, or other device, consisting of specific signals, specific connector pinouts, and a specific communications protocol.

Wireless access is also increasingly being provided to smaller hand held computers, such as Personal Digital Assistants (PDAs). One method for providing wireless access to a PDA is to design a cradle or sleeve that the PDA can slide into. A wireless modem is then either built into the cradle/sleeve or the cradle/sleeve can include a slot into which a wireless modem card can be inserted. In the latter case, the cradle/sleeve passes the signals from the wireless modem card through to the PDA and vise versa.

Unfortunately, conventional PDAs typically do not implement the PCMCIA standard. Thus, a wireless modem card designed for installation into such a cradle/sleeve device is not interchangeable with, for example, a laptop wireless modem card. Not only does this mean a user with both types of devices must buy two different modem cards, but a manufacture must configure the factory to build two or more different modem cards, which drives up the cost to produce them.

SUMMARY OF THE INVENTION

A wireless modem card is configured to allow the wireless modem card to work with multiple device types. In one aspect of the invention, a wireless modem card comprises a host interface configured to interface the wireless modem card with a host device of a first type. The wireless modem card is configured to detect whether a modem interface device configured to interface the wireless modem card with a host device of a second type is communicatively coupled with the host interface. The wireless modem card is also configured to reconfigure the host interface in response to the presence of the modem interface device to enable the wireless modem card to interface with the host device of the second type through the modem interface device.

In another aspect of the invention, a modem interface device comprises a host interface configured to communicatively couple the modem interface device with a host device, a modem interface configured to communicatively couple the modem interface device with a wireless modem card that can be reconfigured to communicate with a plurality of host device types, and a modem interface circuit communicatively coupled with the host interface and the modem interface.

In one embodiment, the modem interface circuit is configured to receive a power on signal, turn on the wireless modem card in response to receiving the power on signal, receive a signal from the wireless modem card indicating that the wireless modem card has received a message for the host device, and turn on the host device so that the wireless modem card can communicate the received message to the host device through the modem interface device.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Although the following discussion relates general to configuring a PCMCIA wireless modem card for use with devices that do not support the PCMCIA interface, it will be apparent that the systems and methods for using a wireless modem card can be employed to allow a wireless modem card originally configured to implement a specific interface standard to work with a wide variety of device types. Therefore, the examples described below are for illustration only and are not intended to limit the invention to any particular devices or configurations.

In order to overcome the problems described above so that a single modem card can be configured to work with multiple device types, the systems and methods for using a wireless modem card use a configurable wireless modem card. Thus, a wireless modem card configured to implement one interface standard can be designed to reconfigure itself to implement multiple interface standards. For example, a PCMCIA wireless modem card can be designed so that it can also interface with an alternative, non-PCMCIA PDA device. In order to accomplish this, the wireless modem card must be able to sense when it is installed in an alternative device and then reconfigure itself to communicate with the alternative device. As such, a pin, or pins, on the wireless modem card connector can be used to sense the presence of an alternative device.

An example signal-to-pin assignment, i.e., connector pinout, is illustrated in table 1 for a PCMCIA card connector. In the discussion that follows, methods for re-configuring the PCMCIA pinout and signals, so that a PCMCIA wireless modem card can be used in multiple device types, are discussed and explained. But it should be noted that the systems and methods for using a wireless modem card can be applied to any wireless modem cards configured to implement any applicable interface standard and are not limited to PCMCIA wireless modem cards.

Thus, for example, pins 44 and 45, signals IORD# and IOWR# respectively, can be used to sense if the wireless modem card is installed in an alternative device, i.e., a non-PCMCIA device. One way to do this is to have IORD# and IOWR# tied to ground when the wireless modem card is installed in an alternative device, such as a PDA sleeve equipped with a wireless modem card slot. Therefore, if the wireless modem card senses that IORD# and IOWR# are at a logic low level, then it will reconfigure the connector pinout and signals to interface with the sleeve/PDA.

Figure 1:
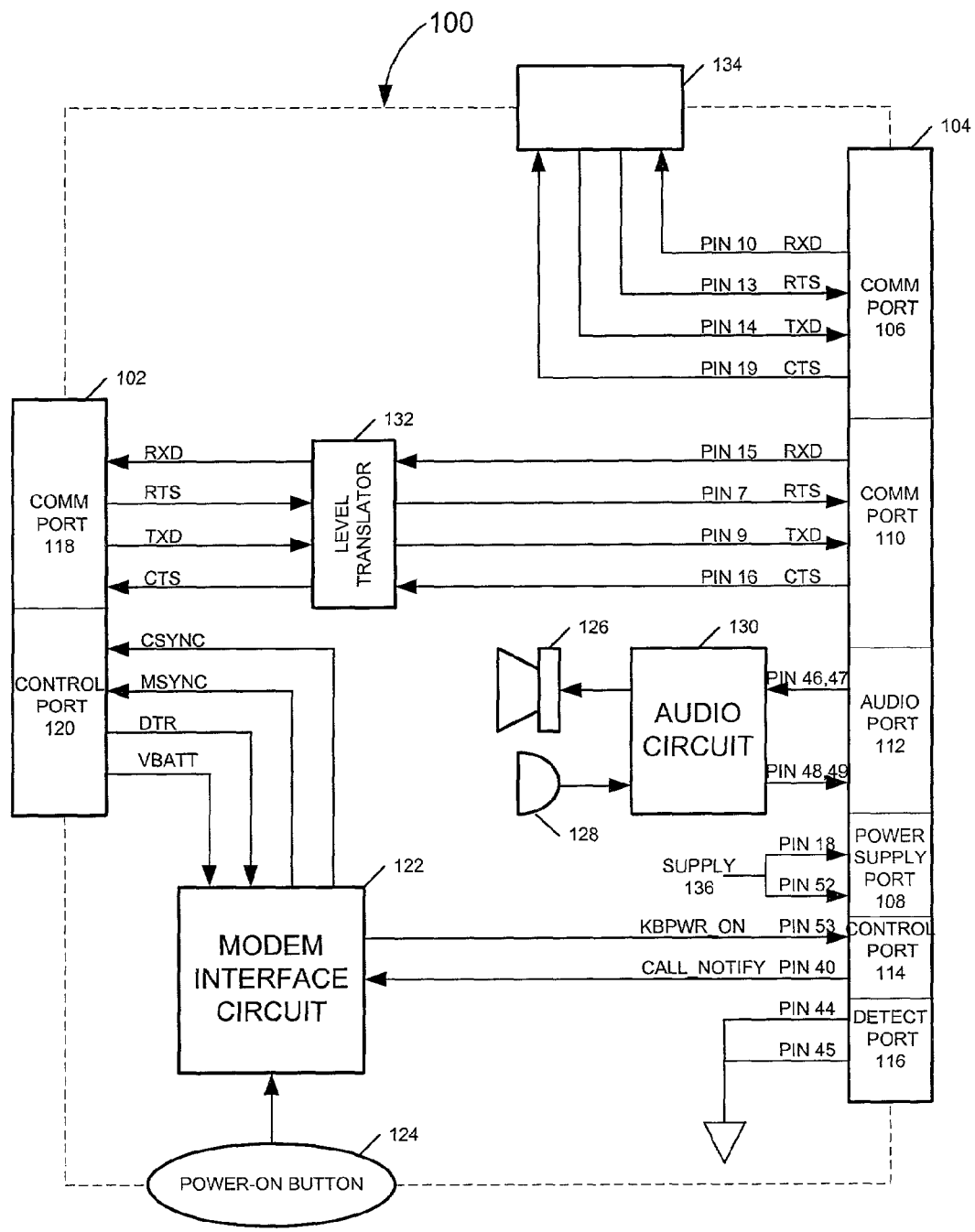
FIG. 1 is a logical block diagram of an example modem interface device in accordance with one aspect of the invention.

The sleeve, or modem interface device, preferably includes customized interface circuits and/or firmware to assist the reconfigured wireless modem card to interface with the PDA or other host device. A logical block diagram of an example modem interface device 100 configured in accordance with the systems and methods for using a wireless modem card is illustrated in FIG. 1. Device 100 comprises a host device interface 102, which is configured to interface device 100 with a host device such as a PDA. Device 100 also includes a modem interface 104 that is configured to interface device 100 with a wireless modem card, such as a PCMCIA wireless modem card.

As can be seen in FIG. 1, modem interface 104 includes a modem interface device detection port 116. The pins included in this port, in this case pins 44 and 45, can be read by a wireless modem card interfaced with modem interface 104. Thus, for example, connecting these pins to ground within device 100 so that they are at a logic low level can provide an indication to the wireless modem card that device 100 is present.

TABLE 1

| PIN | Signal | I/O | Function |
|---|---|---|---|
| 1 | GND | DC | Ground |
| 2 | D3 | I/O | Data Bit 3 |
| 3 | D4 | I/O | Data Bit 4 |
| 4 | D5 | I/O | Data Bit 5 |
| 5 | D6 | I/O | Data Bit 6 |
| 6 | D7 | I/O | Data Bit 7 |
| 7 | CE1# | I | Card Enable |
| 8 | A10 | I | Address Bit 10 |
| 9 | OE# | I | Output Enable |
| 10 | A11 | I | Address Bit 11 |
| 11 | A9 | I | Address Bit 9 |
| 12 | A8 | I | Address Bit 8 |
| 13 | A13 | I | Address Bit 13 |
| 14 | A14 | I | Address Bit 14 |
| 15 | WE# | I | Write Enable |
| 16 | IREQ# | O | Interrupt Request |
| 17 | VCC | DC IN | Supply Voltage |
| 18 | VPP1 | DC IN | Programming and Peripheral Supply 1 |
| 19 | A16 | I | Address Bit 16 |
| 20 | A15 | I | Address Bit 15 |
| 21 | A12 | I | Address Bit 12 |
| 22 | A7 | I | Address Bit 7 |
| 23 | A6 | I | Address Bit 6 |
| 24 | A5 | I | Address Bit 5 |
| 25 | A4 | I | Address Bit 4 |
| 26 | A3 | I | Address Bit 3 |
| 27 | A2 | I | Address Bit 2 |
| 28 | A1 | I | Address Bit 1 |
| 29 | A0 | I | Address Bit 0 |
| 30 | D0 | I/O | Data Bit 0 |
| 31 | D1 | I/O | Data Bit 1 |
| 32 | D2 | I/O | Data Bit 2 |

TABLE 1-continued

| PIN | Signal | I/O | Function |
|---|---|---|---|
| 33 | IOIS16# | O | I/O Port in 16-Bit |
| 34 | GND | DC | Ground |
| 35 | GND | DC | Ground |
| 36 | CD1# | O | Card Detect |
| 37 | D11 | I/O | Data Bit 11 |
| 38 | D12 | I/O | Data Bit 12 |
| 39 | D13 | I/O | Data Bit 13 |
| 40 | D14 | I/O | Data Bit 14 |
| 41 | D15 | I/O | Data Bit 15 |
| 42 | CE2# | I | Card Enable |
| 43 | VS1# | O | Voltage Sense 1 |
| 44 | IORD# | I | I/O Read |
| 45 | IOWR# | I | I/O Write |
| 46 | A17 | I | Address Bit 17 |
| 47 | A18 | I | Address Bit 18 |
| 48 | A19 | I | Address Bit 19 |
| 49 | A20 | I | Address Bit 20 |
| 50 | A21 | I | Address Bit 21 |
| 51 | VCC | DC IN | Supply Voltage |
| 52 | VPP2 | DC IN | Programming and Peripheral Supply 2 |
| 53 | A22 | I | Address Bit 22 |
| 54 | A23 | I | Address Bit 23 |
| 55 | A24 | I | Address Bit 24 |
| 56 | A25 | I | Address Bit 25 |
| 57 | VS2# | O | Voltage Sense 2 |
| 58 | RESET | I | Card Reset |
| 59 | WAIT# | O | Extend Bus Cycle |
| 60 | INPACK# | O | Input Port Acknowledge |
| 61 | REG# | I | Register select & I/O Enable |
| 62 | SPKR# | O | Audio Digital Waveform |
| 63 | STSCHG | O | Card Status Changed |
| 64 | D8 | I/O | Data Bit 8 |
| 65 | D9 | I/O | Data Bit 9 |
| 66 | D10 | I/O | Data Bit 10 |
| 67 | CD2# | O | Card Detect |
| 68 | GND | DC | Ground |

If the signal levels on the pins comprising modem interface device detection port 116 indicate that device 100 is present, then the wireless modem card interfaced with modem interface 104 can reconfigure itself in order to communicate with the host device interfaced with host interface 102.

Modem interface device 100 can also include a card insertion detect port (not shown) that can be used by device 100 to detect the presence of a wireless modem card. Alternative methods of alerting modem interface device 100 that a wireless modem card is installed, can include: a sensor (not shown), such as an infrared sensor, included in device 100; or through a switch or button that can be set to indicate the presence of the wireless modem. Such a switch or button can be included in device 100 or in the wireless modem card. Thus, when the sensor or switch/button is activated, depending on the embodiment, configuration of the interface between device 100 and the wireless modem card is initiated.

A host device and a wireless modem card, interfaced to device 100, can communicate with each other over a serial communication link. For example, in device 100 both the host interface and the modem interface include communication ports 118 and 110, respectively. Thus, upon sensing that device 100 is present through port 116, and/or receiving a configuration instruction from device 100, the wireless modem card would reconfigure itself to use communications port 110 to communicate with a new host device interfaced with device 100.

Not only would the wireless modem card need to reconfigure its pin assignments, but it would also need to configure itself for the correct communications and signaling protocols. In FIG. 1, for example, communications ports 118 and 110 are configured for RS-232 serial communication and, therefore, consist of signals RXD, RTS, TXD, and CTS. Thus, to communicate with a host device through device 100, a wireless modem card needs to be configured to implement RS-232 signaling through communications port 110.

The wireless modem card and/or the host device may require signal level translation on the signals passed between ports 118 and 110. Therefore, device 100 can also include a signal level translator, such as an RS-232 signal level translator 132.

Modem interface 104 can also include a second communications port 106. Such a port 106 can be used, for example, to interface the wireless modem card to a diagnostic monitoring device. In this case, device 100 can also include a diagnostic monitoring interface 134 configured such that a diagnostic monitoring device can be connected to device 100. As such, not only does a wireless modem card interfaced to modem interface 104 need to reconfigure its pinouts to accommodate communications port 106, but it also needs be configured to communicate, using the appropriated communications protocol with a diagnostic monitoring device or any other device connected to port 106.

Again, in FIG. 1 port 106 is implemented as an RS-232 port. But both communications ports 110 and/or 106 can be configured for alternative communication protocols and signaling.

Modem interface 104 can also include a power supply port 108 through which device 100 can supply power to a wireless modem card interfaced with interface 104.

An audio port 112 can be used to interface audio circuit 130 to a wireless modem card for wireless voice communications can also be included in modem interface 104. Audio circuit 130 can be configured to take audio signals form microphone 128, amplify them, and send them to an audio processor on a wireless modem card through port 112. Audio circuit 130 can then also take audio signals from the audio processor, amplify them, and then send them to speaker 126.

It should also be noted that at least a portion of the audio processor can be included in audio circuit 130.

In order for a wireless modem card to effectively communicate through device 100 with a host device interfaced to host interface 102, device 100 preferably includes modem interface circuit 122. In this case, host interface 102 and modem interface 104 preferably include control ports 120 and 114, respectively. These ports are used by modem interface circuit 122 to control the operation of a wireless modem card and a host device interfaced thereto.

Figure 2:
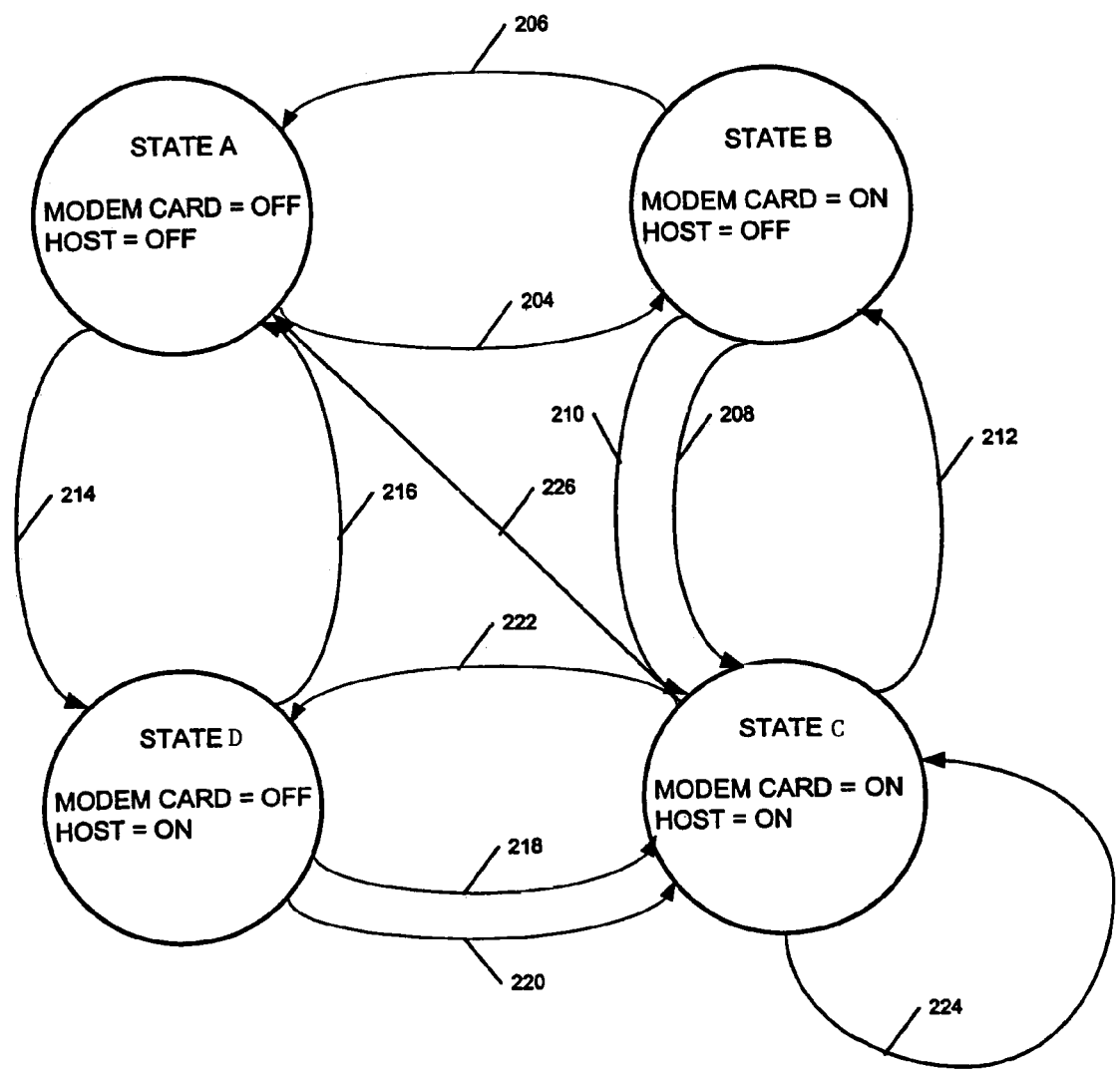
FIG. 2 is a state diagram illustrating how a modem interface device, such as the device of FIG. 1, can control the operation of a host device and a wireless modem card interfaced thereto.

For example, turning on and off a host device and a wireless modem card interfaced with device 100 must be coordinated in order for the host device to send and/or receive messages through the wireless modem card. FIG. 2 is a state diagram illustrating the four possible states, in relation to power on status, of the wireless modem card and the host device. Initially, in state A, both the host device and the wireless modem card are off. In state B, the wireless modem card is turned on. The wireless modem card itself does not have a power on switch or key. Therefore, to enter state B, the modem interface device preferably includes a power switch or button 124 (see FIG. 1). Thus, to enter state B from state A, a user must press power button 124 in step 204.

Once power button 124 is pressed in step 204, modem interface device 100 must be able to power on the wireless modem card. Therefore, control port 114 preferably includes a power on signal, in this case KBPWR_ON on pin 53, that can be used to power on the wireless modem card. Modem interface circuit 122 preferably receives a signal when power on button 124 is pressed (step 204). Thus, modem interface circuit 122 then preferably generates the appropriate signal on KBPWR_ON. For example, in one implementation KBPWR_ON must be pulled low.

When the wireless modem card receives the appropriate power up signal, it will initiate a power on sequence. For example, as illustrated by the logical block diagram of FIG. 3, a wireless modem card 300 configured in accordance with the systems and methods for using a wireless modem card can include a power management circuit 312. Circuit 312 can be configured to receive the KBPWR_ON signal and initiate the power on sequence in response thereto. Circuit 312 can also be configured to check the modem interface device detection port, or some other signal that indicates the presence of a modem interface device, to ensure that: 1) a modem interface device is present; and 2) that the power on signal is received, before initiating the power on sequence. Alternatively, circuit 312 can rely solely on KBPWR_ON to power on wireless modem card 300.

It is also preferable that modem interface circuit 122 hold KBPWR_ON at the appropriate level for a predetermined period to ensure that power management circuit 312 has sufficient time to receive the signal and power on wireless modem card 300. For example, modem interface circuit 122 can be configured to hold KBPWR_ON low for 1 second. Thus, ensuring sufficient time for wireless modem card 300 to come on.

To transition back to state A, i.e., both the host device and the wireless modem card off, the user would again press power on button 124 in step 206. Preferably, modem interface circuit will generate a short pulse, e.g., 1 second, on KBPWR_ON in response to power on button 124 being pressed in step 206. The short pulse then preferably causes the wireless modem card to power down. For example, power management circuit 312 can receive the pulse and initiate the power down sequence.

Preferably, the power down sequence entails power management circuit 312 placing wireless modem card 300 in a "deep-sleep" mode in which only a few micro-amps of current are being consumed by card 300. This way, card 300 will not drain too much power from the host device's battery, but can be turned on quickly if power on button 124 is pressed (step 204).

Once the wireless modem card is on, the host device must also be on, i.e., state C, in order for the wireless modem card to forward received messages to the host device. One way the transition to state C can be accomplished, of course, is for the user to press a power on button on the host device in step 208. Similarly, to transition back to state B, the user can press the host device power on key in step 212.

Turning on the host device in this manner, however, means that the host device is on and wasting power, while waiting for an incoming message. Preferably, the wireless modem card is configured to turn the host device on when it receives an incoming message. This way, the host device can remain powered down while waiting for an incoming message and thus, preserve power.

Therefore, the wireless modem card is preferably configured to generate, in step 210, a CALL_NOTIFY signal when an incoming message is received in state B. The CALL_NOTIFY signal can be sent to modem interface circuit 122 through modem control port 114. Modem interface circuit 122 is then preferably configured to generate an appropriate signal that can be sent to the host device through control port 120 on host interface 102. When the host device receives the signal, it preferably turns on, recognize that the wireless modem card is polling it, and initiate a communication session with the wireless modem card through communications port 118.

For example, if the host device is a Palm V™, then the CSYNC and MSYNC lines can be used to power up the host device and indicate an incoming message. Thus, when modem interface circuit 122 receives the CALL_NOTIFY signal, it can assert CSYNC by pulling it to a logic high level. Asserting CSYNC then preferably causes the host device to sample the voltage level on MSYNC. If the MSYNC voltage level is in a predetermined range, e.g., 1.6V to 2.4V, then the host device will realize that the wireless modem card is polling it. The host device is then preferably configured to initiate a communication session with the wireless modem card.

The transitions from states A to B to C as described above allow for the efficient reception of messages. An alternative situation is when the user wants to send a message using the host device. In this case, the user will turn on their host device, e.g., a Palm V™, causing a transition form state A to state D. This is accomplished when the user presses the power on button on the host device in step 214. To transition back to state A, the user presses the power on button again in step 216.

Once in state D, the user will cause the host device to generate a message to be sent using the wireless modem card. Therefore, the host device preferably generates a signal indicating that it has a message to be sent. For example, the host device can assert a DTR signal included in control port 120. Preferably, modem interface circuit 122 monitors DTR and when it is asserted, pulls KBPWR_ON to a logic low level to initiate a power on sequence on the wireless modem card. Once powered up, the wireless modem can be configured to assert CTS to indicate to the host device that it is ready to receive the message.

Once the message is sent, the host device can close communication port 118, and the wireless modem card can be configured to remain in state C waiting for another message (step 224).

Alternatively, the transition to and from state C can be accomplished by pressing power on key 124 in steps 200 and 222.

In certain implementations, pressing the power button on the host device will cause a transition from state C directly to state A. In this case, pressing the host device power key preferably generates a control signal that is sent to modem interface circuit 122 through port 120. Modem interface circuit 122 can then cause a power down sequence on the wireless modem card.

In addition, if the host device is removed, i.e., de-coupled from host interface 102, while in state B or C, then modem interface circuit 122 preferably powers the wireless modem card off. This can be accomplished, for example, by monitoring a VBATT signal included in control port 120. If VBATT is removed, then modem interface circuit 122 is preferably configured to recognize that the host device has been removed. Modem interface circuit 122 can then be configured to pull KBPWR_ON to a logic low level.

It should be noted that modem interface circuit 122 can comprise a microprocessor, microcontroller, DSP, or some combination thereof. Alternatively, or in addition, modem interface circuit 122 can include hardware circuits, such as glue logic circuits. These circuits may be designed from discrete components and/or can comprise an ASIC or programmable circuits, such as programmable gate arrays or programmable logic devices.

It should also be noted, that while the examples provided herein refer to a modem interface device that is separate from the host device, the modem interface device can be incorporated into a particular host device.

As mentioned previously, FIG. 3 illustrates an example wireless modem card 300 that comprises a processor 310, power management circuit 312 and a card interface connector 302. Initially, the pinout for connector 302 is configured for a certain interface standard, such as the PCMCIA standard. Again table 1 lists the pinout for a PCMCIA connector. When wireless modem card 300 detects the presence of modem interface device 100, however, it must reconfigure the pinout of connector 302 in order to communicate with a new host device through modem interface device 100. Thus, the signal assignments for connector 302 must be reconfigured to interface with ports 106, 108, 110, 112, 114, and 116, for example. A reconfigured pinout for connector 302 is illustrated in table 2.

TABLE 2

| PIN | Signal | I/O | NC | Function |
|---|---|---|---|---|
| 1 | GND | DC | | Ground |
| 2 | D3 | I/O | | Data Bit 3 |
| 3 | D4 | I/O | | Data Bit 4 |
| 4 | D5 | I/O | | Data Bit 5 |
| 5 | D6 | I/O | | Data Bit 6 |
| 6 | D7 | I/O | | Data Bit 7 |
| 7 | CE1# | I | | RTS (DTE Point of View) |
| 8 | A10 | I | | Address Bit 10 |
| 9 | OE# | I | | 1'XD (DTE Point of View) |
| 10 | A11 | I | NC | RTS UART2 for Datalogger |
| 11 | A9 | I | | Address Bit 9 |
| 12 | A8 | I | | Address Bit 8 |
| 13 | A13 | I | NC | TXD UART2 for Datalogger |
| 14 | A14 | I | NC | RXD UART2 for Datalogger |
| 15 | WE# | I | | RXD (DTE Point of View) |
| 16 | IREQ# | O | | CTS (DTE Point of View) |
| 17 | VCC | DC IN | | Suppy Voltage |
| 18 | VPP1 | DC IN | NC | BATT+ Supply from Sleeve |
| 19 | A16 | I | NC | CTS UART2 for Datalogger |
| 20 | A15 | I | NC | Micro Controller Programming Line |
| 21 | A12 | I | NC | Micro Controller Programming Line |
| 22 | A7 | I | | Address Bit 7 |
| 23 | A6 | I | | Address Bit 6 |
| 24 | A5 | I | | Address Bit 5 |
| 25 | A4 | I | | Address Bit 4 |
| 26 | A3 | I | | Address Bit 3 |
| 27 | A2 | I | | Address Bit 2 |
| 28 | A1 | I | | Address Bit 1 |
| 29 | A0 | I | | Address Bit 0 |
| 30 | D0 | I/O | | Data Bit 0 |
| 31 | D1 | I/O | | Data Bit 1 |
| 32 | D2 | I/O | | Data Bit 2 |
| 33 | IOIS16# | O | | I/O Port is 16-Bit |
| 34 | GND | DC | | Ground |
| 35 | GND | DC | | Ground |
| 36 | CD1# | O | | Card Detect |
| 37 | D11 | I/O | | Data Bit 11 |
| 38 | D12 | I/O | | Data Bit 12 |
| 39 | D13 | I/O | | Data Bit 13 |
| 40 | D14 | I/O | | Data Bit 14 |
| 41 | D15 | I/O | | Data Bit 15 |
| 42 | CE2# | I | NC | Card Enable |
| 43 | VS1# | O | NC | Voltage Sense 1 |
| 44 | IORD# | I | | Ground |
| 45 | IOWR# | I | | Ground |
| 46 | A17 | I | NC | Speaker (+) |
| 47 | A18 | I | NC | Speaker (−) |
| 48 | A19 | I | NC | Microphone (+) |
| 49 | A20 | I | NC | Microphone (−) |
| 50 | A21 | I | NC | Available |

TABLE 2-continued

| PIN | Signal | I/O | NC | Function |
|---|---|---|---|---|
| 51 | VCC | DC IN | | Supply Voltage |
| 52 | VPP2 | DC IN | NC | BATT+ Supply from Sleeve |
| 53 | A22 | I | NC | KBDPWR_ON |
| 54 | A23 | I | NC | CALL_NOTIFY |
| 55 | A24 | I | NC | AUDIO_SLEEP |
| 56 | A25 | I | NC | Available |
| 57 | VS2# | O | NC | Voltage Sense 2 |
| 58 | RESET | I | | VCHARGER |
| 59 | WAIT# | O | | Extend Bus Cycle |
| 60 | INPACK# | O | | Input Port Acknowledge |
| 61 | REG# | I | | Register select & I/O Enable |
| 62 | SPKR# | O | | Audio Digital Waveform |
| 63 | STSCHG | O | | Card Status Changed |
| 64 | D8 | I/O | | Data Bit 8 |
| 65 | D9 | I/O | | Data Bit 9 |
| 66 | D10 | I/O | | Data Bit 10 |
| 67 | CD2# | O | | Card Detect |
| 66 | GND | DC | | Ground |

Figure 3:
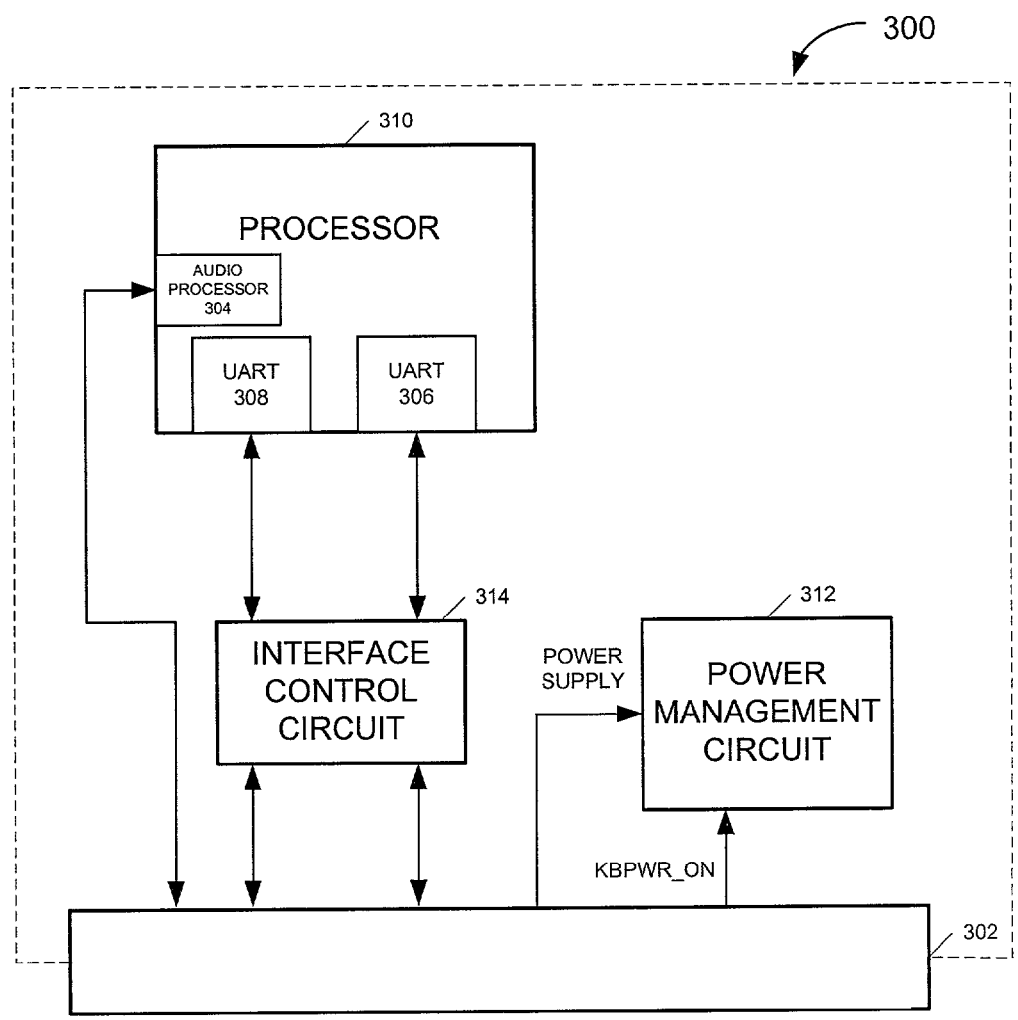
FIG. 3 is a logical block diagram illustrating an example wireless modem card in accordance with another aspect of the invention.

As can be seen in FIG. 3, processor 310 can include a first UART 306 configured to interface with the host device through communications port 110 and a second UART 308 configured to communicate with a diagnostic monitoring device, for example, through communications port 106.

If wireless modem card 300 is a PCMCIA card, then it will include an interface control circuit 314 to which the UART signals will be interfaced. Circuit 314 provides the MUX control for the UART signals that is required for PCMCIA implementations.

In addition, processor 310 can include an audio processor 304 for processing audio signals sent and received through audio port 112. Alternatively, audio processor 304 can be a separate device from processor 304 or, again, can be included, at least in part, in modem interface device 100.

Preferably, processor 310, or more particularly the software used to control processor 310, can also be configured to support battery status reporting by monitoring the battery voltage supplied through power supply port 108.

Thus, as has been described above, by configuring wireless modem card 300 to reconfigure its connection interface 302 from a first connection standard, such as PCMCIA, to an alternative interface, such as one required by modem interface device 100, wireless modem card 300 can be configured for use with multiple different types of host devices. As a result, the cost to both users and manufacturers is reduced, and the users convenience is enhanced.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A modem interface device, comprising:
a host interface configured to communicatively couple the modem interface device with a host device;
a modem interface configured to communicatively couple the modem interface device with a wireless modem card that can be reconfigured to communicate with a plurality of host device types; and
a modem interface circuit communicatively coupled with the host interface and the modem interface, the modem interface circuit configured to:
receive a power on signal,
turn on the wireless modem card in response to receiving the power on signal,
receive a signal from the wireless modem card indicating that the wireless modem card has received a message for the host device, and
turn on the host device so that the wireless modem card can communicate the received message to the host device through the modem interface device.

2. The modem interface device of claim 1, further comprising a wireless modem card detect input, the modem interface device configured to:
receive a modem present signal through the wireless modem card detect input; and
begin initiate a wireless modem card interface configuration in response to receiving the modem present signal.

3. The modem interface device of claim 1, wherein the modem interface circuit is further configured to receive a power off signal and to turn off the wireless modem card in response to the received power off signal.

4. The modem interface device of claim 3, further comprising a power on/off input, wherein the power on and power off signals are received from the power on/off input.

5. The modem interface device of claim 3, wherein the power off signal is received from the host device.

6. The modem interface device of claim 1, wherein the host interface and the modem interface each include a communication port, and wherein the wireless modem card communicates the received message with the host device through the communication ports included in the two interfaces.

7. The modem interface device of claim 6, further comprising a signal level translator coupled with the communication ports included in the host and modem interfaces, the signal level translator configured to perform signal level translation on signals communicated between the wireless modem card and the host.

8. The modem interface device of claim 1, further comprising a hardware identifier coupled with the modem interface, the hardware identifier configured to indicate the presence of the modem interface device to the wireless modem card.

9. The modem interface device of claim 1, further comprising an audio circuit coupled with the modem interface, the audio circuit configured to interface received audio signals with the wireless modem card and to output audio signals received from the wireless modem card.

10. The modem interface of claim 1, further comprising a diagnostic interface coupled with the modem interface, the diagnostic interface configured to:
allow a diagnostic monitoring device to interface with the modem interface device; and
communicate diagnostic monitoring signals between the diagnostic monitoring device and the wireless modem card.

11. The modem interface device of claim 1, configured to supply power to the wireless modem card through the modem interface.

12. The modem interface circuit of claim 1, wherein the modem interface circuit is further configured to:
sense when the host device is de-coupled from the host interface, and
turn the wireless modem card off when the host device is de-coupled from the host interface.

13. A modem interface device, comprising:
a host interface configured to communicatively couple the modem interface device with a host device;

a modem interface configured to communicatively couple the modem interface device with a wireless modem card that can be reconfigured to communicate with a plurality of host device types; and a modem interface circuit coupled with the host interface and the modem interface, the modem interface circuit configured to:

receive a signal from the host device indicating that the host device has a message to communicate with the wireless modem card; and turn on the wireless modem card in response to the received signal so that the host device can communicate the message with the wireless modem card through the modem interface device.

14. The modem interface device of claim 13, wherein the host interface and the modem interface each comprise a communication port, and wherein the host device communicates the message with the wireless modem card through the communication ports included in the two interfaces.

15. The modem interface device of claim 14, further comprising a signal level translator coupled with the communication ports included in the host and modem interfaces, wherein the signal level translator is configured to perform signal level translation on signals communicated between the wireless modem card and the host device.

16. The modem interface device of claim 13, wherein the modem interface circuit is further configured to:

sense when the host device is de-coupled from the host interface, and turn the wireless modem card off when the host device is de-coupled from the host interface.

17. A wireless modem card, comprising a host interface configured to interface the wireless modem card with a host device of a first type, the wireless modem card configured to:

detect whether a modem interface device configured to interface the wireless modem card with a host device of a second type is communicatively coupled with the host interface, and reconfigure the host interface in response to the presence of the modem interface device to enable the wireless modem card to interface with the host device of the second type through the modem interface device.

18. The wireless modem card of claim 17, wherein the reconfigured host interface comprises a control port configured to interface the wireless modem card with the modem interface device.

19. The wireless modem card of claim 18, configured to output a notification signal through the control port to the modem interface device whenever the wireless modem card receives a message that is to be communicated to the host device of the second type.

20. The wireless modem card of claim 19, wherein the wireless modem card is further configured to turn on when a power on signal is received from the modem interface device through the control port.

21. The wireless modem card of claim 20, wherein the reconfigured host interface further comprises a modem interface device detection port configured to receive an indicator signal when a modem interface device is coupled with the host interface.

22. The wireless modem card of claim 21, further comprising a power management circuit coupled to the control port, the power management circuit configured to:

receive the power on signal; and begin a power on sequence for the wireless modem card when the power management circuit has received the power on signal.

23. The wireless modem card of claim 22, wherein the power management circuit is coupled to the modem interface device detect port and is further configured to:

receive the indicator signal; and begin a power on sequence for the wireless modem card when the power management circuit has received both the power on signal and the indicator signal.

24. The wireless modem card of claim 17, wherein the reconfigured host interface comprises an audio port configured to send audio signals generated by the wireless modem card to the modem interface device and to receive audio signals from the modem interface device.

25. The wireless modem card of claim 17, wherein the reconfigured host interface comprises a diagnostic port configured to interface the wireless modem card to a diagnostic device.

26. The wireless modem card of claim 17, wherein the reconfigured host interface comprises a power supply port configured to interface power supplied by the modem interface device to the wireless modem card.

27. The wireless modem card of claim 26, wherein the wireless modem card is further configured to monitor the power supplied through the power supply port.

28. The wireless modem card of claim 17, wherein the reconfigured host interface comprises a serial communication port configured to allow the wireless modem card to communicate with the host device of the second type.

29. A portable communication system, comprising:

a host device of a first type configured to send and receive messages;

a modem interface device configured to communicatively couple with the host device of the first type and comprising a wireless modem card slot; and a wireless modem card capable of installation in the wireless modem card slot comprising a host interface configured to communicatively couple the wireless modem card with a host device of a second type, the wireless modem card configured to:

sense when it is installed in the wireless modem card slot, and reconfigure the host interface to allow the wireless modem card to be communicatively coupled with the host device of the first type.

30. The portable communication system of claim 29, wherein the modem interface device comprises:

a host interface configured to communicatively couple the modem interface device with the host device of the first type;

a modem interface configured to communicatively couple the modem interface device with the wireless modem card; and a modem interface circuit communicatively coupled with the host interface and the modem interface, the modem interface circuit configured to:

receive a power on signal, turn on the wireless modem card in response to receiving the power on signal, receive a signal from the wireless modem card indicating that the wireless modem card has received a message for the host device of the first type, and turn on the host device of the first type so that the wireless modem card can communicate the received message to the host device through the modem interface device.

31. The portable communication system of claim 29, wherein the host device of the first type is configured to initiate a communication session with the wireless modem card through the modem interface device after it is turned on by the modem interface circuit.

32. The portable communication system of claim 29, wherein the modem interface device comprises:
- a host interface configured to communicatively couple the modem interface device with the host device of the first type;
- a modem interface configured to communicatively couple the modem interface device with the wireless modem card; and
- a modem interface circuit coupled with the host interface and the modem interface, the modem interface circuit configured to:
  - receive a signal from the host device of the first type indicating that the host device has a message to communicate with the wireless modem card; and
  - turn on the wireless modem card in response to the received signal so that the host device of the first type can communicate the message to the wireless modem card through the modem interface device.

\* \* \* \* \*